US009843697B2

(12) United States Patent
Takahashi

(10) Patent No.: US 9,843,697 B2
(45) Date of Patent: Dec. 12, 2017

(54) IMAGE READING APPARATUS

(71) Applicant: FUJI XEROX CO., LTD., Tokyo (JP)

(72) Inventor: Kaoru Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/603,765

(22) Filed: Jan. 23, 2015

(65) Prior Publication Data

US 2016/0021274 A1 Jan. 21, 2016

(30) Foreign Application Priority Data

Jul. 15, 2014 (JP) ................. 2014-145453

(51) Int. Cl.
*H04N 1/04* (2006.01)
*H04N 1/028* (2006.01)
*H04N 1/00* (2006.01)

(52) U.S. Cl.
CPC ..... *H04N 1/02835* (2013.01); *H04N 1/00989* (2013.01); *H04N 1/02895* (2013.01)

(58) Field of Classification Search
CPC ........... H04N 1/02835; H04N 1/00989; H04N 1/02895
USPC ............... 358/484, 475, 509, 497, 482, 483; 250/227.11, 227.28, 227.29, 227.31, 250/227.32, 234–236, 239; 399/220, 221
See application file for complete search history.

(56) References Cited

U.S. PATENT DOCUMENTS

| | | | | |
|---|---|---|---|---|
| 4,008,954 A | * | 2/1977 | Ogawa | G03G 15/047 355/1 |
| 4,220,978 A | * | 9/1980 | Rhyins | H04N 1/02815 348/197 |
| 4,402,017 A | * | 8/1983 | Takei | H04N 1/193 358/484 |
| 4,490,740 A | * | 12/1984 | Moriguchi | H04N 1/484 358/500 |
| 4,953,937 A | * | 9/1990 | Kikuchi | A61B 1/002 362/335 |
| 4,974,927 A | * | 12/1990 | Kimura | G02B 26/103 385/115 |
| 5,311,255 A | * | 5/1994 | Josephson | G03G 15/55 346/33 MC |
| 6,075,240 A | * | 6/2000 | Watanabe | G02B 6/06 250/208.1 |

(Continued)

FOREIGN PATENT DOCUMENTS

| | | |
|---|---|---|
| JP | 3-41403 A | 2/1991 |
| JP | 2008039860 A * | 2/2008 |
| JP | 2008-275689 A | 11/2008 |

OTHER PUBLICATIONS

Communication dated Aug. 3, 2017, from the State Intellectual Property Office of People's Republic of China in counterpart Application No. 201510096784.7.

*Primary Examiner* — Cheukfan Lee
(74) *Attorney, Agent, or Firm* — Sughrue Mion, PLLC

(57) ABSTRACT

An image reading apparatus includes a light-guide member that moves in a direction crossing a longitudinal direction of the light-guide member and that emits light, which has entered from an incident surface of the light-guide member, as light that is linearly distributed in the longitudinal direction, a light source that emits the light, and an optical fiber that guides the light emitted by the light source to the incident surface.

7 Claims, 7 Drawing Sheets

(56) References Cited

U.S. PATENT DOCUMENTS

| | | | |
|---|---|---|---|
| 6,861,661 B1* | 3/2005 | Nakajima | H04N 1/195 |
| | | | 250/584 |
| 7,538,911 B2* | 5/2009 | Sakurai | H04N 1/02815 |
| | | | 358/474 |
| 9,080,950 B2* | 7/2015 | Kovalchuk | G01J 3/2823 |
| 2002/0171880 A1* | 11/2002 | Yui | H04N 1/00976 |
| | | | 358/505 |
| 2004/0041798 A1* | 3/2004 | Kim | G06F 1/1626 |
| | | | 345/179 |

* cited by examiner

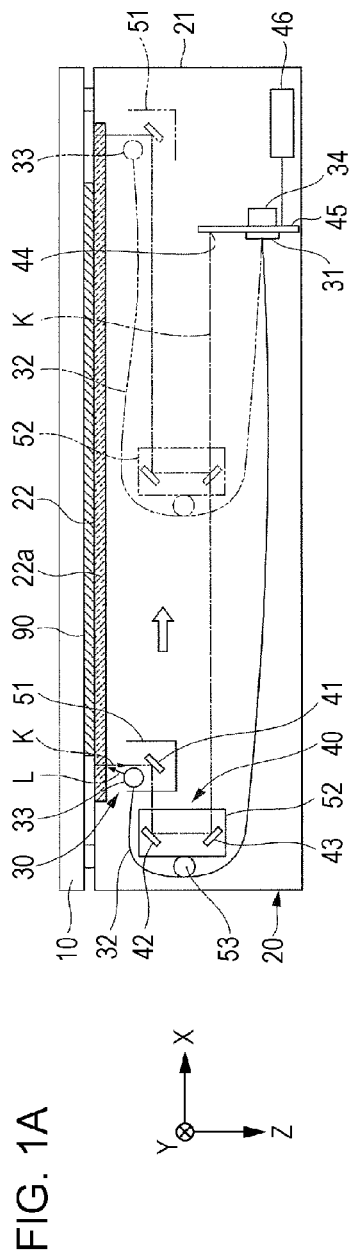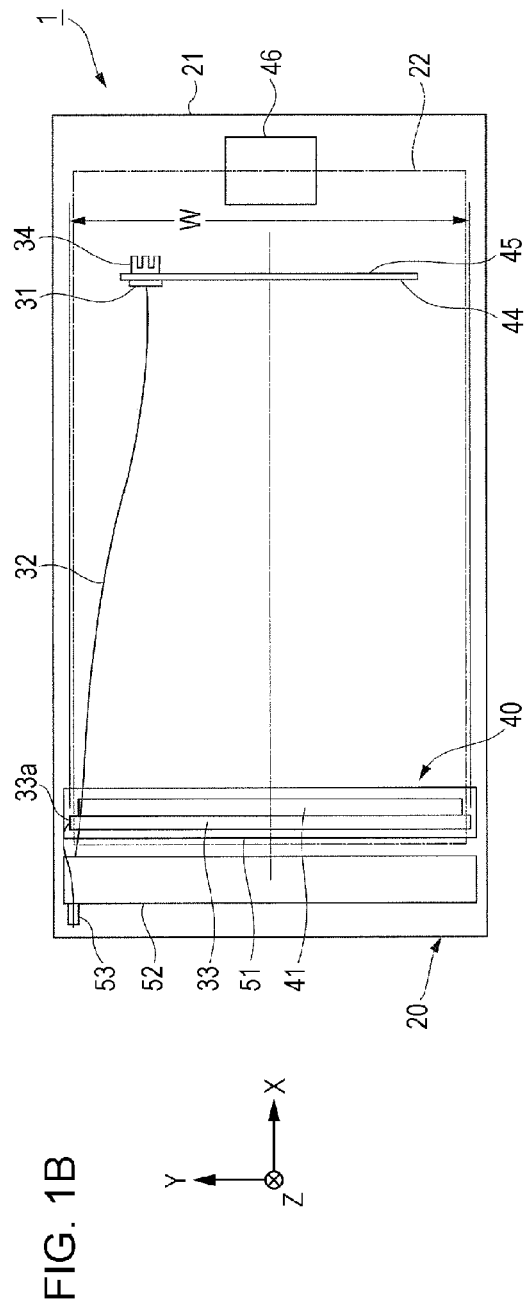
FIG. 1A
FIG. 1B

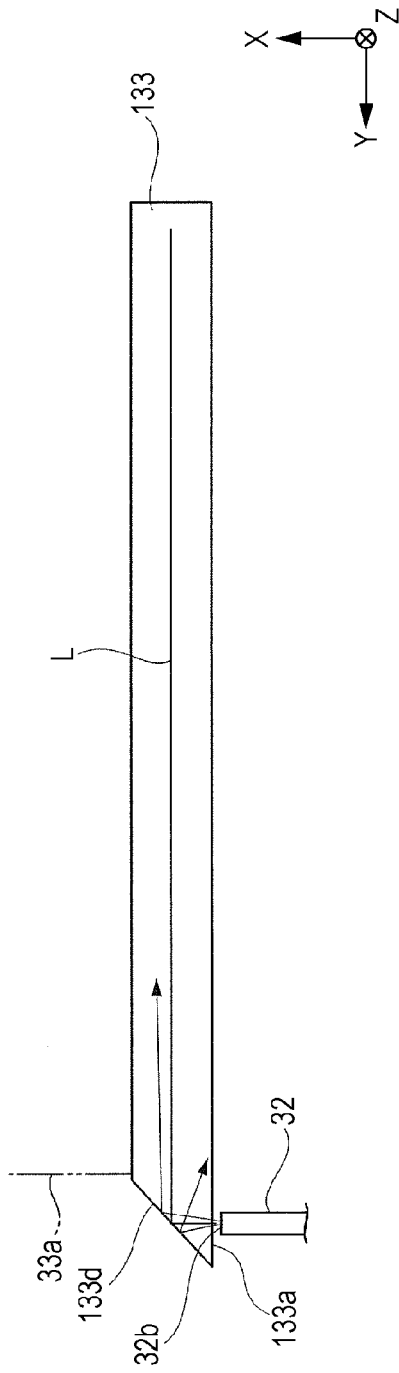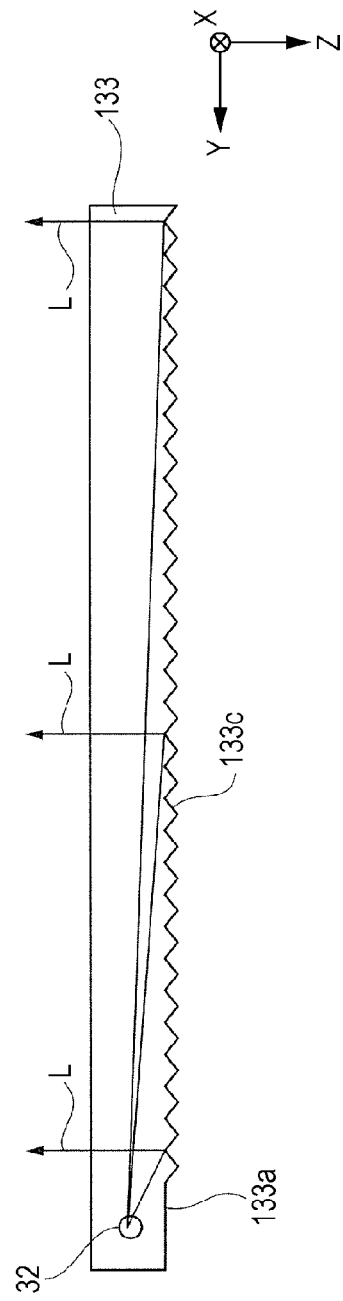
FIG. 6A
FIG. 6B

IMAGE READING APPARATUS

CROSS-REFERENCE TO RELATED APPLICATIONS

This application is based on and claims priority under 35 USC 119 from Japanese Patent Application No. 2014-145453 filed Jul. 15, 2014.

BACKGROUND (i) Technical Field

The present invention relates to an image reading apparatus.

(ii) Related Art

As an example of an image forming apparatus that reads an image by radiating light onto a document and that forms an image, there is an image forming apparatus that includes a light-guide member that has a columnar shape and that has a light-capturing portion formed on one end of the light-guide member in the axial direction of the light-guide member and a knurled groove formed on a portion of an outer peripheral surface of the light-guide member, the knurled groove extending in the axial direction, and a light source that is constituted by a light-emitting diode (LED).

SUMMARY

According to an aspect of the invention, there is provided an image reading apparatus including a light-guide member that moves in a direction crossing a longitudinal direction of the light-guide member and that emits light, which has entered from an incident surface of the light-guide member, as light that is linearly distributed in the longitudinal direction, a light source that emits the light, and an optical fiber that guides the light emitted by the light source to the incident surface.

BRIEF DESCRIPTION OF THE DRAWINGS

An exemplary embodiment of the present invention will be described in detail based on the following figures, wherein:

FIGS. 1A and 1B are diagrams illustrating an image reading apparatus according to an exemplary embodiment of the present invention, and FIG. 1A and FIG. 1B are respectively a sectional side view and a plan view illustrating the interior of a body of the image reading apparatus in a see-through manner;

FIG. 4A and FIG. 4B are respectively a plan view as seen in the direction of arrow Z and a side view as seen in the direction of arrow X;

FIGS. 6A and 6B are diagrams illustrating another exemplary embodiment of the light-guide member, FIG. 6A and FIG. 6B are respectively a plan view as seen in the direction of arrow Z and a side view as seen in the direction of arrow X; FIG. 7A and FIG. 7B are respectively a perspective view and a sectional view taken along a vertical plane including the relay board.

DETAILED DESCRIPTION

Exemplary embodiments of the present invention will be described below with reference to the accompanying drawings.

<Description of Image Reading Apparatus>

Figure 2:
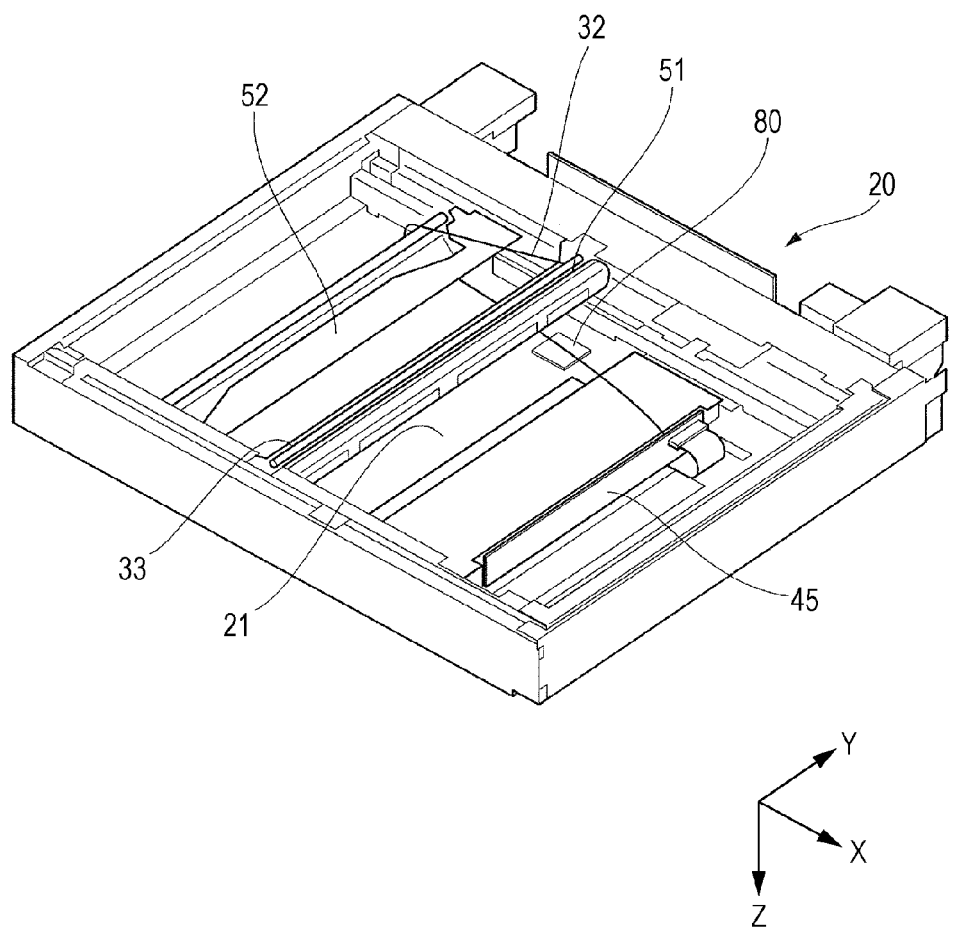
FIG. 2 is a perspective view illustrating the interior of the body of the image reading apparatus illustrated in FIGS. 1A and 1B.

FIGS. 1A and 1B are diagrams illustrating an image reading apparatus 1 according to an exemplary embodiment of the present invention, and FIG. 1A and FIG. 1B are respectively a sectional side view and a plan view illustrating the interior of a body 20 of the image reading apparatus in a see-through manner. In FIGS. 1A and 1B, the direction of arrow X, the direction of arrow Y, and the direction of arrow Z are perpendicular to one another. FIG. 2 is a perspective view illustrating the interior of the body 20 of the image reading apparatus 1 illustrated in FIGS. 1A and 1B.

The image reading apparatus 1 illustrated in FIGS. 1A and 1B is configured to radiate white light L onto a document 90 and read, as image information, light (hereinafter referred to as reflected light K) that has been reflected from the document 90. The image reading apparatus 1 includes the body 20 and a platen cover 10.

The platen cover 10 is mounted in such a manner as to allow a document table 22 (described below) of the body 20 to be exposed or covered and is used, in a state of covering the document table 22, for pressing the document 90, which is placed on the document table 22, against a platen glass 22a of the document table 22.

The document table 22 that includes the platen glass 22a, which is transparent and has a flat plate-like shape, is formed on a top surface of a metallic apparatus frame 21 that forms a housing of the body 20. The document 90, which is to be read, is to be placed on the document table 22. A light-radiation unit 30 that radiates the white light L onto the document 90 through the platen glass 22a and a reading part 40 that receives the reflected light K from the document 90, which is irradiated with the white light L, in such a manner as to read an image of the document 90 are disposed in the interior of the body 20.

<Description of Light-Radiation Unit>

Figure 3:
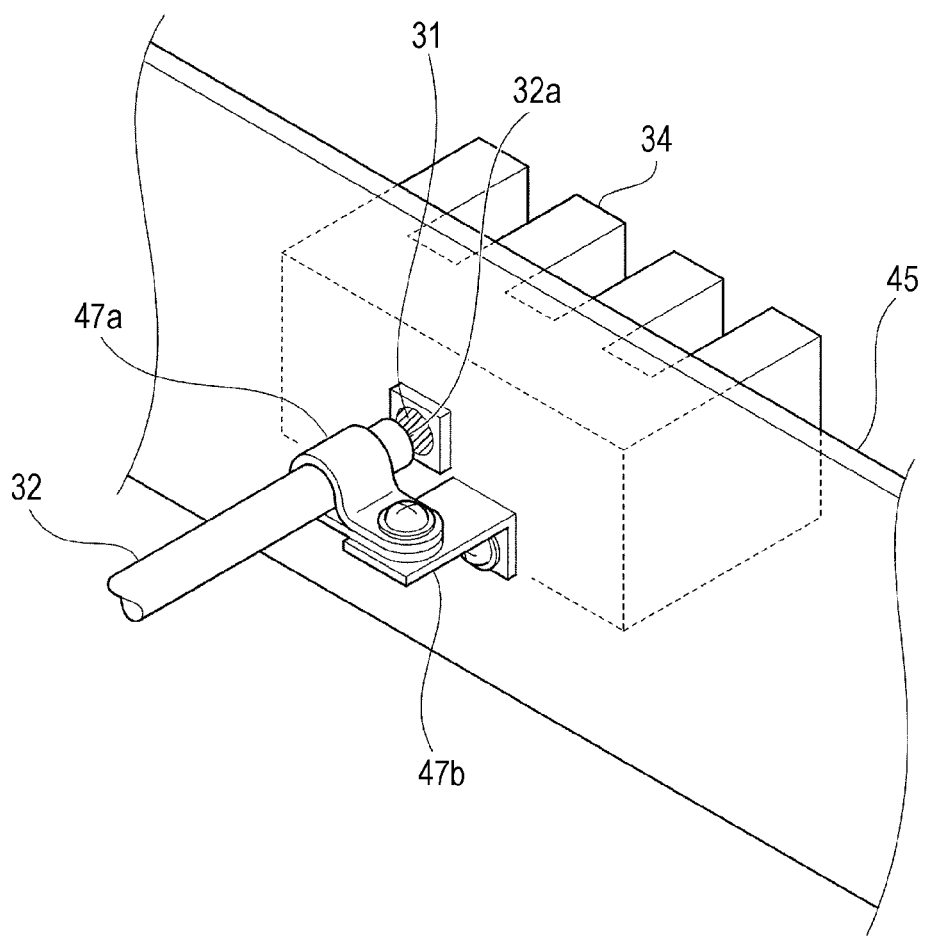
FIG. 3 is a perspective view illustrating a state in which a power LED and a heat sink are mounted on a CCD substrate.

The light-radiation unit 30 includes a power LED 31 (an example of a light source) that emits, for example, the white light L by being driven by a control circuit (not illustrated), a light-guide member 33, an optical fiber 32, and a heat sink 34 (an example of a heat-radiation member). FIG. 3 is a perspective view illustrating a state in which the power LED 31 and the heat sink 34 are mounted on a CCD substrate 45. As illustrated in FIG. 3, the power LED 31 is integrally formed with the CCD substrate 45. The heat sink 34 is configured to radiate heat and is disposed on the CCD substrate 45 together with the power LED 31. The heat sink 34 radiates heat that is generated by the power LED 31 through the CCD substrate 45.

Figure 4A:
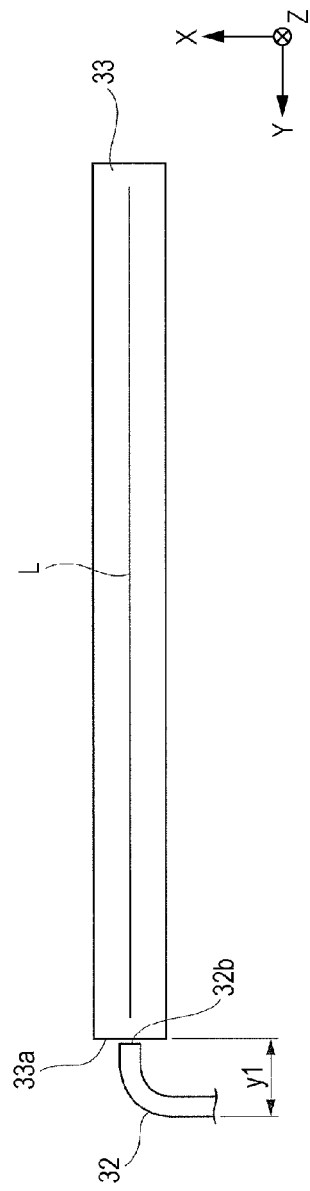
FIGS. 4A and 4B are diagrams illustrating a light-guide member.
Figure 4B:
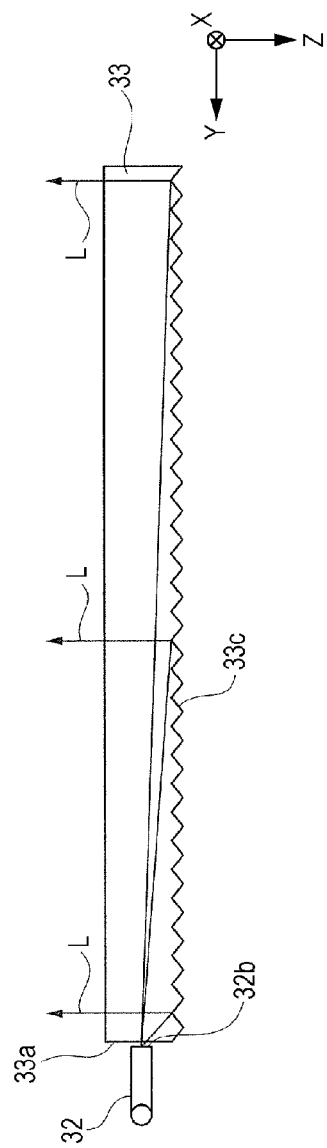

FIGS. 4A and 4B are diagrams illustrating the light-guide member 33, and FIG. 4A and FIG. 4B are respectively a plan view as seen in the direction of arrow Z and a side view as seen in the direction of arrow X. As illustrated in FIGS. 4A and 4B, the light-guide member 33 is formed in a columnar shape whose longitudinal direction (hereinafter sometimes referred to as longitudinal direction Y) is parallel to the direction of arrow Y, which is the width direction of the document 90 (see FIGS. 1A and 1B). The light-guide member 33 has a surface on which the white light L is to be incident (hereinafter referred to as incident surface 33a) formed at one of its ends in the longitudinal direction Y (its left end in FIGS. 4A and 4B). Although the incident surface 33a is a surface perpendicular to the longitudinal direction Y as an example, the incident surface 33a is not limited to a surface perpendicular to the longitudinal direction Y and may be a surface that crosses the longitudinal direction Y.

The light-guide member 33 is fixed to a full-rate carriage 51, which will be described later and which is an example of a scanning unit (see FIGS. 1A and 1B), in such a manner that the longitudinal direction Y is parallel to the direction in which the full-rate carriage 51 extends.

In addition, as illustrated in FIG. 4B, a knurled groove 33c is formed in at least a portion of the peripheral surface of the light-guide member 33, which has a columnar shape, the portion being located at the bottom side in the direction of arrow Z. The light-guide member 33 reflects the white light L, which enters the inside of the light-guide member 33 from the incident surface 33a, by a reflecting surface, which is formed of the knurled groove 33c, in such a manner as to emit the white light L that has been linearly distributed in the longitudinal direction Y to the document 90 on the document table 22 (see FIGS. 1A and 1B).

The optical fiber 32 is formed in such a manner that the diameter of the cross section of the optical fiber 32 is, for example, 0.25 mm or larger and 1.0 mm or smaller. The optical fiber 32 may be, for example, a plastic optical fiber made of a high-purity polymethylmethacrylate (PMMA) and the like as long as the optical fiber 32 is an illumination optical fiber.

As illustrated in FIG. 3, a portion of the optical fiber 32 on the side on which an incident-end surface 32a is present is supported by a clamp 47a, which has a P-shaped cross section, and the clamp 47a is fixed to the CCD substrate 45 by a metal fitting 47b, which has an L shape. Accordingly, the incident-end surface 32a of the optical fiber 32 is fixed in place in such a manner as to face a surface of the power LED 31 from which the white light L is to be emitted.

A portion of the optical fiber 32 on the side on which an emitting-end surface 32b (see FIGS. 4A and 4B) is present is fixed to the full-rate carriage 51 (see FIGS. 1A and 1B) in a state where the emitting-end surface 32b faces the incident surface 33a of the light-guide member 33.

With this configuration, the optical fiber 32 guides the white light L, which is emitted by the power LED 31, to the incident surface 33a of the light-guide member 33.

As illustrated in FIGS. 1A and 1B, the reading part 40 includes the full-rate carriage 51, a half-rate carriage 52, a charge coupled device (CCD) 44, which is an image sensor, and a processing circuit 46. The CCD 44 is formed on the CCD substrate 45. The CCD substrate 45 is fixed to the apparatus frame 21, which does not move.

The full-rate carriage 51 and the half-rate carriage 52 extend in the direction of arrow Y and are supported by the apparatus frame 21. The full-rate carriage 51 and the half-rate carriage 52 are caused to move in the direction of arrow X with respect to the apparatus frame 21 by a motor and a driving system, which are not illustrated.

Here, the full-rate carriage 51 moves along the entire length of the platen glass 22a along the direction of arrow X. The half-rate carriage 52 moves by a distance half of the travel distance of the full-rate carriage 51. In addition, the moving velocity of the half-rate carriage 52 is set to be half of the moving velocity of the full-rate carriage 51.

As described above, since the light-guide member 33 is fixed to the full-rate carriage 51, the light-guide member 33 is caused to move in the direction of arrow X that crosses the longitudinal direction Y along with a movement of the full-rate carriage 51.

The full-rate carriage 51 and the half-rate carriage 52 are provided with mirrors that guide the reflected light K, which has been linearly distributed, from the document 90 that is irradiated with the white light L, which has been radiated by the light-guide member 33 and which has been linearly distributed in the direction of arrow Y, to the CCD 44.

More specifically, the full-rate carriage 51 is provided with a first mirror 41 that reflects the reflected light K in the form of lines from the document 90 toward the half-rate carriage 52. The half-rate carriage 52 is provided with a second mirror 42 and a third mirror 43 that reflect the reflected light K, which is reflected by the first mirror 41, toward the CCD 44.

Note that each of the first mirror 41, the second mirror 42, and the third mirror 43 has a planar reflecting surface and is formed in such a manner as to extend across the full width of the platen glass 22a along the direction of arrow Y.

The full-rate carriage 51 and the half-rate carriage 52 move synchronously with each other in the direction of arrow X while having the above-described velocity relationship, so that the length of an optical path of the reflected light K, which is emitted by the document 90, from the document 90 to the CCD 44 does not vary regardless of the positions of the full-rate carriage 51 and the half-rate carriage 52 in the direction of arrow X.

A pulley 53, which is rotatable, is disposed on the rear side of the half-rate carriage 52 in a travelling direction of the half-rate carriage 52, which is parallel to the direction of arrow X. The optical fiber 32 is wound around the pulley 53. The optical fiber 32 is arranged in such a manner as to pass behind the pulley 53 in the travelling direction (the direction of arrow X) of the half-rate carriage 52, so that an optical path of the white light L from the incident-end surface 32a (see FIG. 3) to the emitting-end surface 32b (see FIGS. 4A and 4B) makes a turn. The pulley 53 prevents the position of the optical fiber 32, which moves along with movements of the full-rate carriage 51 and the half-rate carriage 52, from changing.

The CCD 44 is formed in such a manner as to have a width (dimension along the direction of arrow Y) shorter than the length of each of the first mirror 41, the second mirror 42, and the third mirror 43 and is formed on the CCD substrate 45, which has dimensions (height along the direction of arrow Z×width) of, for example, 50 mm×200 mm. An imaging optical system (not illustrated) is disposed on the optical path of the reflected light K between the third mirror 43 and the CCD 44 (excluding the third mirror 43 and the CCD 44). The imaging optical system reduces the width (dimension along the direction of arrow Y) of the reflected light K in the form of lines, which has been reflected by the third mirror 43, to the width of the CCD 44 and focuses the reflected light K on the CCD 44 in such a manner as to form an image.

The CCD 44 converts the image formed of the reflected light K into an electrical signal by photoelectric conversion. The processing circuit 46 performs processing, such as analog correction processing (e.g., gain and offset adjustment), A/D conversion processing, shading correction processing, and delay processing, on image information, which is the electrical signal obtained as a result of the photoelectric conversion performed by the CCD 44.

<Operations of Light-Radiation Unit and Reading Part>

As illustrated in FIGS. 1A and 1B, before image information is read, the full-rate carriage 51 and the half-rate carriage 52 are stationary at the left ends in their movable ranges in the direction of arrow X.

When the document 90 placed on the document table 22 is read, the control circuit (not illustrated) turns on the power LED 31 as a result of receiving an input of an instruction to start reading. The white light L that has been emitted by a light-emitting surface of the power LED 31, which has been turned on, is incident on the inside of the optical fiber 32 from the incident-end surface 32a (see FIG. 3) of the optical fiber 32 and is advanced toward the emitting-end surface 32b (FIGS. 4A and 4B) by repeating total reflection inside of the optical fiber 32.

The white light L, which has been emitted by the emitting-end surface 32b of the optical fiber 32, is incident on the inside of the light-guide member 33 from the incident surface 33a of the light-guide member 33. Then, the white light L, which has been linearly distributed in the longitudinal direction Y as a result of being reflected by the reflecting surface formed of the knurled groove 33c (see FIG. 4B), is emitted toward the document 90 on the document table 22.

The document 90 placed on the document table 22 is irradiated with the white light L, which has been linearly distributed in the longitudinal direction Y, and the reflected light K, which is the light reflected by an image of the document 90 and which has been linearly distributed in the longitudinal direction Y, is emitted by the document 90. The reflected light K in the form of lines reaches the first mirror 41, which is disposed in the full-rate carriage 51, and is reflected by the first mirror 41 to the second mirror 42 of the half-rate carriage 52. In addition, the reflected light K is reflected by the third mirror 43.

The length of the reflected light K in the form of lines, which has been reflected by the third mirror 43, in the direction of arrow X is reduced by the imaging optical system (not illustrated), and the reflected light K is focused on the CCD 44 in such a manner as to form an image.

The CCD 44 converts the image formed of the reflected light K into image information by photoelectric conversion and outputs the image information to the processing circuit 46.

During the above-described series of operations from the emission of the white light L from the power LED 31 to the photoelectric conversion performed by the CCD 44, the full-rate carriage 51 and the half-rate carriage 52 are caused to move synchronously with each other in the direction of arrow X with respect to the apparatus frame 21 by the motor and the driving system, which are not illustrated. In this case, the full-rate carriage 51 moves along the entire length of the document table 22, and the half-rate carriage 52 moves by a distance half of the travel distance of the full-rate carriage 51.

An area in which the white light L in the form of lines, which has been emitted by the light-guide member 33, is radiated onto the document 90 moves in the direction of arrow X along with a movement of the full-rate carriage 51, and an area in which the reflected light K is emitted also moves in the direction of arrow X. The white light L is radiated onto the entire surface of the document 90 before the full-rate carriage 51 reaches the right end within its movable range. As a result, the reflected light K is emitted by the entire surface of the document 90, and image information that corresponds to the entire surface of the document 90 is acquired by the CCD 44.

The image reading apparatus 1 of the present exemplary embodiment has a configuration in which the power LED 31 is disposed on the apparatus frame 21, and thus, the power LED 31 is not disposed at a position facing the incident surface 33a of the light-guide member 33, which moves. Thus, in the image reading apparatus 1 of the present exemplary embodiment, the degree of freedom regarding the installation location of the power LED 31 is larger than that in an image reading apparatus in which the position facing the incident surface 33a of the light-guide member 33 is the only position where the power LED 31 may be disposed.

Since the image reading apparatus 1 has a configuration in which the power LED 31 is disposed on the apparatus frame 21, the heat sink 34 that radiates heat generated by the power LED 31 is also disposed on the apparatus frame 21, which supports the full-rate carriage 51, and is not mounted on the full-rate carriage 51. Therefore, the degree of freedom regarding the installation location of the heat sink 34 is also large.

In addition, in the image reading apparatus 1 of the present exemplary embodiment, since the heat sink 34 is disposed on the apparatus frame 21, a space around the periphery of the heat sink 34 is larger than that in an image reading apparatus in which the heat sink 34 is mounted on the full-rate carriage 51. Therefore, in the image reading apparatus 1 of the present exemplary embodiment, the efficiency of heat exchange between the surrounding air and the heat is improved compared with such an image reading apparatus in which the heat sink 34 is mounted on the full-rate carriage 51. This results in an improvement in heat-radiation performance with respect to the heat generated by the power LED 31, and a decrease in luminous efficiency is suppressed.

In addition, in the image reading apparatus 1 of the present exemplary embodiment, since the space around the periphery of the heat sink 34 is large, the heat sink 34 that has large dimensions may be employed. In this case, the heat-radiation performance of the heat sink 34 having large dimensions is higher than that of the heat sink 34 having small dimensions, and thus, the heat sink 34 having large dimensions more effectively radiates the heat generated by the power LED 31.

In an image reading apparatus in which the power LED 31 and the heat sink 34 are disposed at positions facing the incident surface 33a of the light guide-member 33, the power LED 31 and the heat sink 34 are disposed outside one end of the light-guide member 33 in the longitudinal direction Y.

In contrast, in the image reading apparatus 1 of the present exemplary embodiment, the power LED 31 and the heat sink 34 are disposed not outside one end of the light-guide member 33 in the longitudinal direction Y but on the apparatus frame 21. Thus, in the image reading apparatus 1 of the present exemplary embodiment, a projection amount y1 (see FIG. 4A) from the end of the light-guide member 33 is small.

Consequently, the dimension of the full-rate carriage 51, to which the light-guide member 33 is fixed, in the direction of arrow Y is reduced, and the weight of the full-rate carriage 51 is reduced.

In the image reading apparatus 1 of the present exemplary embodiment, the full-rate carriage 51 is not provided with a component that consumes electric power and that is represented by, for example, the power LED 31. Thus, it is not necessary to connect the body 20 and the full-rate carriage 51 by a flexible flat cable (FFC) that is used for supplying power. Since the FFC includes a metal conductor formed therein, there is a possibility that the FFC may serve as an antenna that receives electromagnetic waves. In addition, since the FFC moves along with a movement of the full-rate carriage 51, there is a possibility that the FFC may accidentally receive surrounding electromagnetic waves.

The image reading apparatus 1 of the present exemplary embodiment does not include such an FFC, and thus, the image reading apparatus 1 does not receive surrounding electromagnetic waves.

Although, in the image reading apparatus 1 of the above-described exemplary embodiment, the optical fiber 32 is a single optical fiber, an optical-fiber bundle formed of multiple optical fibers 32 may be employed as long as it has satisfactory bending performance.

<Another Form of Incident Surface of Optical Fiber>

The optical fiber 32 is arranged in such a manner as to pass behind the half-rate carriage 52 in such a manner that the optical path of the white light L makes a turn, and thus, the optical fiber 32 needs to have reasonable flexibility. The flexibility of the optical fiber 32 improves as the diameter of the cross section of the optical fiber 32 decreases. The diameter of the cross section of the optical fiber 32, which is included in the image reading apparatus 1 of the present exemplary embodiment, is, for example, 0.25 mm or larger and 1.0 mm or smaller, and the optical fiber 32 satisfies a required flexibility. On the other hand, in the power LED 31, the diameter of a light-emitting surface of an LED chip is, for example, about 5.0 mm.

As described above, in the case where the diameter of the light-emitting surface of the power LED 31 is larger than the diameter of the cross section of the optical fiber 32, and where only part of the white light L emitted by the power LED 31 is guided to the incident-end surface 32a of the optical fiber 32, the intensity of the white light L to be radiated onto the document 90 is small.

Figure 5A:
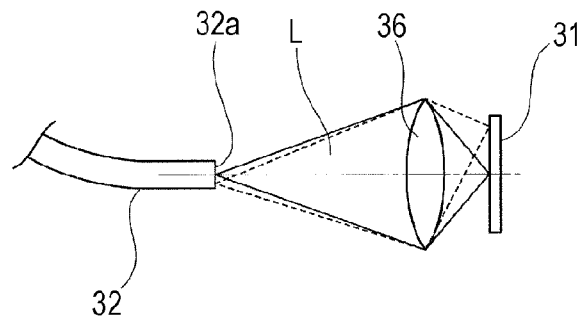
FIGS. 5A, 5B, and 5C are schematic diagrams illustrating a configuration in which a reducing optical system is disposed between the power LED and an incident-end surface of an optical fiber, FIG. 5A schematically illustrating the reducing optical system, FIG. 5B illustrating the reducing optical system provided with a collar, and FIG. 5C illustrating the collar on which snap fits are formed.
Figure 5B:
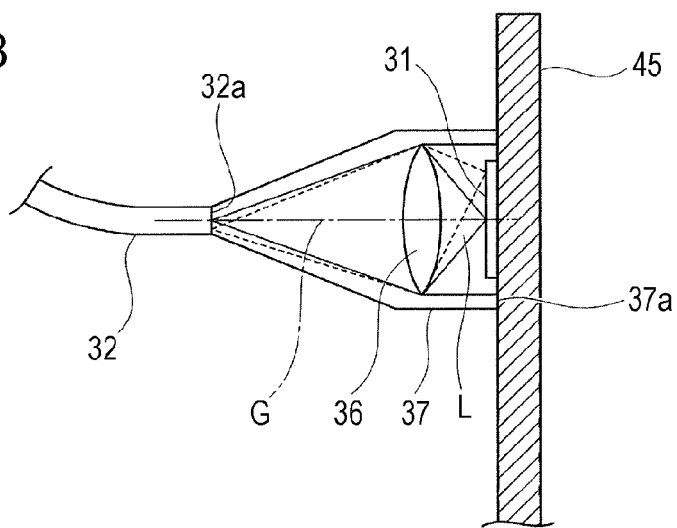
Figure 5C:
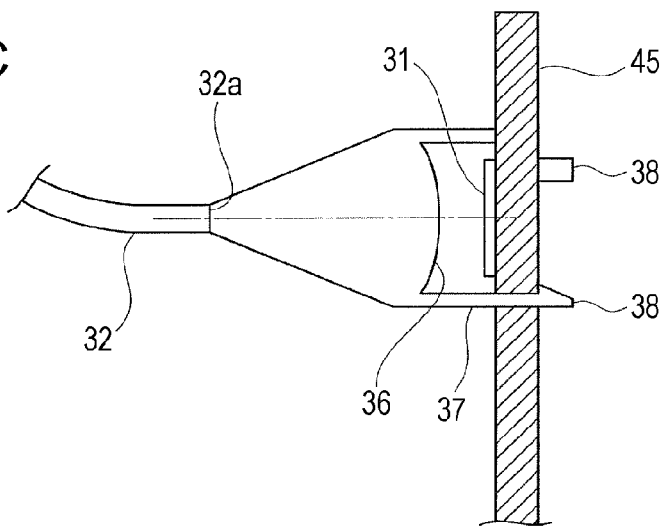

FIGS. 5A, 5B, and 5C are schematic diagrams illustrating a configuration in which a reducing optical system 36 is disposed between the power LED 31 and the incident-end surface 32a of the optical fiber 32 (excluding the power LED 31 and the incident-end surface 32a of the optical fiber 32, and the same applies hereinafter). FIG. 5A schematically illustrates the reducing optical system 36, FIG. 5B illustrates the reducing optical system 36 provided with a collar 37, and FIG. 5C illustrates the collar 37 on which snap fits 38 are formed.

As illustrated in FIG. 5A, for example, the image reading apparatus 1 of the present exemplary embodiment may have a configuration in which the reducing optical system 36 that guides the white light L, which is emitted by the power LED 31, to the incident-end surface 32a of the optical fiber 32 is disposed between the power LED 31 and the incident-end surface 32a of the optical fiber 32.

According to the image reading apparatus 1 having this configuration, the white light L, which is emitted by the light-emitting surface of the power LED 31, is guided to the incident-end surface 32a of the optical fiber 32 by the reducing optical system 36. As a result, the intensity of the white light L, which has been guided to the incident-end surface 32a is larger than that in the case where the reducing optical system 36 is not provided, and the intensity of the white light L that is emitted by the optical fiber 32 to the document 90 through the light-guide member 33 is large.

Note that, an example of the reducing optical system 36 is a lens that is made of glass, an acrylic resin, or the like and that has a positive refractive power, and a telecentric optical system may be employed as the reducing optical system 36.

In a configuration in which the reducing optical system 36 is provided between the power LED 31 and the incident-end surface 32a of the optical fiber 32, for example, as illustrated in FIG. 5B, the reducing optical system 36 may be provided with the collar 37 that surrounds and holds the reducing optical system 36. The length of the collar 37 of the reducing optical system 36 along an optical axis G is set to be such a length that the incident-end surface 32a of the optical fiber 32 is considered an image surface when the light-emitting surface of the power LED 31 is an object surface.

In a configuration in which the reducing optical system 36, which is provided with the collar 37 as described above, is employed, the collar 37 is fixed in place in such a manner that an end portion 37a of the collar 37 is in contact with the CCD substrate 45, on which the power LED 31 is disposed, or the like, so that the distance between the power LED 31 and the reducing optical system 36 on the optical axis G is maintained at a fixed length.

Note that, although the reducing optical system 36 and the collar 37 are integrally formed in the configuration illustrated in FIG. 5B, a configuration in which the reducing optical system 36 and the collar 37 are not integrally formed may be employed.

As illustrated in FIG. 5C, in a configuration in which the reducing optical system 36 is provided with the collar 37, snap fits 38 that pass through the CCD substrate 45 and that fix the collar 37 and the reducing optical system 36 onto the CCD substrate 45 may be formed on the collar 37.

In a configuration in which the snap fits 38 are formed on the collar 37 as described above, when the end portion 37a of the collar 37 is brought into contact with the CCD substrate 45, on which the power LED 31 is disposed, or the like, the snap fits 38 are fitted to the CCD substrate 45, so that the collar 37 and the reducing optical system 36 are fixed onto the CCD substrate 45.

In the case where the number of the snap fits 38 formed on the whole periphery of the collar 37 is two or more, the collar 37 and the reducing optical system 36 may be fixed onto the CCD substrate 45 with higher stability compared with the case where the number of the snap fits 38 formed on the whole periphery of the collar 37 is one.

<Another Form of Incident Surface of Light-Guide Member>

In the image reading apparatus 1 of the present exemplary embodiment, the incident surface 33a of the light-guide member 33 is formed of a surface perpendicular to the longitudinal direction Y of the light-guide member 33 (not limited to a a surface perpendicular to the longitudinal direction Y) as illustrated in FIG. 4A.

FIGS. 6A and 6B are diagrams illustrating a light-guide member 133 that has an incident surface 133a that is formed in such a manner as to be inclined in the direction in which the optical fiber 32 extends with respect to a plane perpendicular to the longitudinal direction Y. FIG. 6A is a plan view as seen in the direction of arrow Z, and FIG. 6B is a side view as seen in the direction of arrow X.

The image reading apparatus 1 of the present exemplary embodiment may include, for example, the light-guide member 133 illustrated in FIGS. 6A and 6B instead of the light-guide member 33 illustrated in FIGS. 4A and 4B. As illustrated in FIGS. 6A and 6B, the light-guide member 133 has the incident surface 133a that is formed in such a manner as to be inclined toward the direction in which the optical fiber 32 extends (the direction of arrow X) with respect to a plane perpendicular to the longitudinal direction Y. More specifically, the incident surface 133a is a surface parallel to the longitudinal direction Y of the light-guide member 133. In addition, a reflecting surface 133d that reflects the white light L, which has entered from the incident surface 133a, toward a reflecting surface, which is formed of a knurled groove 133c.

According to the image reading apparatus 1, which has this configuration, the emitting-end surface 32b of the optical fiber 32 that extends in a direction that crosses the longitudinal direction Y of the light-guide member 133 is caused to face the incident surface 133a of the light-guide member 133 by causing, in the vicinity of the incident surface 133a of the light-guide member 133, the optical fiber 32 to be bent with a curvature smaller than that illustrated in FIG. 4A.

In a configuration in which the light-guide member 133 is employed, the curvature of the optical fiber 32, which has the emitting-end surface 32b facing the incident surface 133a of the light-guide member 133, is smaller than that in a configuration illustrated in FIGS. 4A and 4B in which the light-guide member 33 is employed. Thus, in the case where the optical fiber 32 is used in combination with the light-guide member 133, the intensity of the white light L that leaks to the outside from a bent portion of the optical fiber 32 is smaller than that in the case where the optical fiber 32 is used in combination with the light-guide member 33.

In the image reading apparatus 1 that includes the light-guide member 33 illustrated in FIGS. 4A and 4B, a portion of the optical fiber 32 in the vicinity of the emitting-end surface 32b is bent. The maximum curvature of the bent portion is limited by the specification of the optical fiber 32, and it is difficult to bend the bent portion to a degree of curvature that exceeds the limitation.

As illustrated in FIG. 4A, the outward projection amount y1 of the optical fiber 32 from the incident surface 33a of the light-guide member 33 in the longitudinal direction Y decreases as the curvature of the bent portion of the optical fiber 32 increases. However, the projection amount y1 is set depending on the specification of the optical fiber 32.

On the other hand, in the light-guide member 133 illustrated in FIG. 6A, the incident surface 133a and the reflecting surface 133d are formed outside the incident surface 33a of the light-guide member 33 (see FIG. 4A) in the longitudinal direction Y, and thus, the dimension of the light-guide member 133 in the longitudinal direction Y is larger than that of the light-guide member 33 in the longitudinal direction Y.

However, the dimension of the light-guide member 133, which is larger than that of the light-guide member 33, may be reduced by changing the inclination angle of the incident surface 133a, the inclination angle of the reflecting surface 133d, and the like, and the incident surface 133a and the reflecting surface 133d may be formed so as to have a dimension in the longitudinal direction Y smaller than the projection amount y1 of the optical fiber 32, which projects from the incident surface 33a.

Therefore, in the image reading apparatus 1 having a configuration in which the light-guide member 133 is employed, the dimension of the full-rate carriage 51, on which the light-guide member 133 is disposed, in the longitudinal direction Y is smaller than that in the image reading apparatus 1 having a configuration in which the light-guide member 33 is employed.

<Another Arrangement Form 1 of Power LED>

Although the power LED 31 is disposed on the CCD substrate 45 in the image reading apparatus 1 of the present exemplary embodiment illustrated in FIGS. 1A and 1B, the power LED 31 is not limited to be disposed on the CCD substrate 45.

Figure 7A:
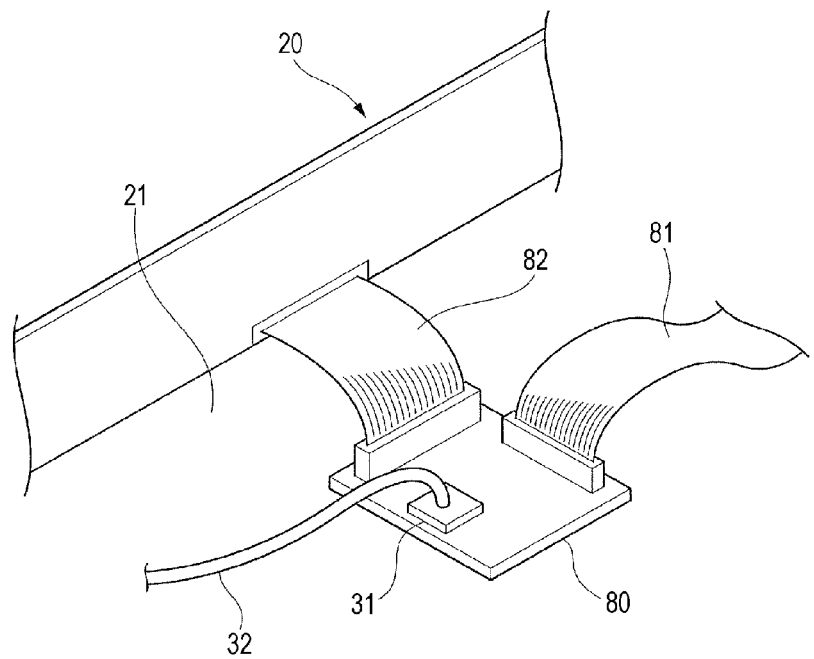
FIGS. 7A and 7B are diagrams illustrating a configuration in which the power LED is fixed to a relay board.
Figure 7B:
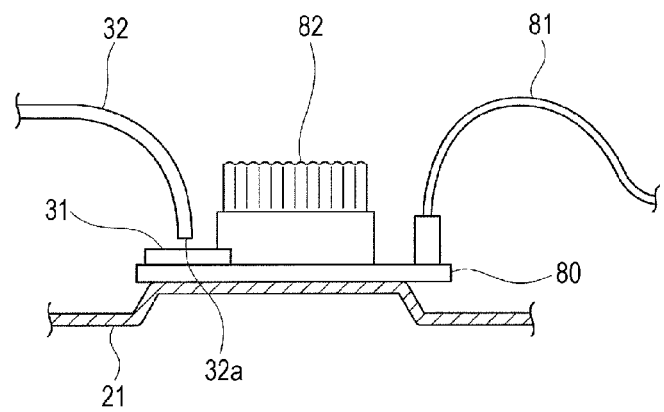

FIGS. 7A and 7B are diagrams illustrating a configuration in which the power LED 31 is fixed to a relay board 80. FIG. 7A is a perspective view, and FIG. 7B is a sectional view taken along a vertical plane including the relay board 80.

For example, as illustrated in FIG. 7A, the relay board 80 that is used for connecting a wiring line 81 that extends from the control circuit (not illustrated) with a wiring line 82 that extends from another portion is disposed on the apparatus frame 21 of the body 20. As illustrated in FIG. 7B, the relay board 80 is tightly fixed to the apparatus frame 21.

The image reading apparatus 1 may have a configuration in which the power LED 31 is disposed on the relay board 80 illustrated in FIGS. 7A and 7B instead of on the CCD substrate 45.

Note that, similarly to the configuration illustrated in FIG. 3, a portion of the optical fiber 32 on the side on which the incident-end surface 32a is present may be fixed to the CCD substrate 45 or the relay board 80 with fixing members such as the clamp 47a, which has a P-shaped cross section, and the metal fitting 47b, which has an L shape. This fixing structure is not illustrated in FIGS. 7A and 7B.

Similarly to the configuration illustrated in FIGS. 5A, 5B, and 5C, in the configuration illustrated in FIGS. 7A and 7B, the reducing optical system 36 may be disposed between the power LED 31 and the incident-end surface 32a of the optical fiber 32.

Also in the image reading apparatus 1 having this configuration, the degree of freedom regarding the installation location of the power LED 31 is larger than in an image reading apparatus in which the position facing the incident surface 33a of the light-guide member 33 is the only position where the power LED 31 may be disposed.

In addition, the dimension of the full-rate carriage 51 in the direction of arrow Y is reduced, and the weight of the full-rate carriage 51 is reduced.

The image reading apparatus 1 having this configuration does not include the heat sink 34 (see FIGS. 1A and 1B) that is independent and that radiates heat generated by the power LED 31. However, since the relay board 80 on which the power LED 31 is disposed is tightly fixed to the apparatus frame 21 as illustrated in FIG. 7B, the heat generated by the power LED 31 is transferred onto the metallic apparatus frame 21 via the relay board 80. A metal has heat-radiation performance better than those of a resin, a ceramic, and the like, and thus, the apparatus frame 21 realizes the function of the heat sink 34 (see FIGS. 1A and 1B) and radiates the heat generated by the power LED 31.

Since the image reading apparatus 1 having the above configuration does not include the independent heat sink 34, the costs for the heat sink 34 is not necessary unlike the case where the image reading apparatus 1 includes the independent heat sink 34.

Although the power LED 31 is fixed to the body 20 via the CCD substrate 45 or the relay board 80 in the above-described configurations, the present invention is not limited to these configurations, and a configuration in which the power LED 31 is directly fixed to the body 20 may be employed.

<Another Arrangement Form 2 of Power LED>

The power LED 31 is not limited to be disposed on the body 20 and may be disposed on the full-rate carriage 51. In this case, the power LED 31 may be disposed in an area W (see FIG. 1B) located between the ends of the light-guide member 33 in the longitudinal direction Y.

Also in the image reading apparatus 1 having the above configuration, in which the power LED 31 is disposed on the full-rate carriage 51 in the area W, the degree of freedom regarding the installation location of the power LED 31 is larger than in an image reading apparatus in which the position facing the incident surface 33a of the light-guide member 33 is the only position where the power LED 31 may be disposed.

In addition, the dimension of the full-rate carriage 51 in the direction of arrow Y is reduced.

In the above-described configurations, the light-guide member 33 has the incident surface 33a formed at one of the ends of the light-guide member 33 in the longitudinal direction Y. However, in the image reading apparatus 1 according to the exemplary embodiment of the present invention, a light-guide member that has incident surfaces formed at the ends of the light-guide member in the longitudinal direction may be employed. In this case, a configuration in which optical fibers, each of which guides light from a light source, are disposed in such a manner that an emitting-end surface of each of the optical fibers faces a corresponding one of the incident surfaces formed at the ends of the light-guide member may be employed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
    a light-guide member configured to move in a direction crossing a longitudinal direction of the light-guide member,
        wherein the light-guide member is configured to emit light, which has entered from an incident surface of the light-guide member, as light that is linearly distributed in the longitudinal direction;
    a light source configured to emit the light;
    an optical fiber configured to guide the light emitted by the light source to the incident surface;
    an apparatus frame to which the light source is fixed;
    a scanning unit comprising a full-rate carriage configured to cause the light-guide member to move in the direction crossing the longitudinal direction;
    a half-rate carriage configured to move in the direction crossing the longitudinal direction, the half-rate carriage comprising a pulley;
    a CCD substrate; and
    a heat-radiation member that is disposed inside of the apparatus frame to which the light source is fixed and that is configured to radiate heat generated by the light source,
    wherein the heat-radiation member is disposed in an area located between ends of the light-guide member in the longitudinal direction, and
    wherein the optical fiber is wound around the pulley.

2. The image reading apparatus according to claim 1, wherein the light source is disposed on a body of the image reading apparatus that supports the scanning unit.

3. The image reading apparatus according to claim 1, further comprising:
    a reducing optical system disposed between the light source and an incident surface of the optical fiber.

4. The image reading apparatus according to claim 1, wherein the incident surface of the light-guide member on which the light emitted by the optical fiber is to be incident is formed in such a manner as to be inclined with respect to a plane perpendicular to the longitudinal direction.

5. The image reading apparatus according to claim 1, wherein the light source is disposed in an area located between ends of the light-guide member in the longitudinal direction.

6. The image reading apparatus according to claim 1, wherein the heat-radiation member comprises a heat sink.

7. An image reading apparatus comprising:
    a light-guide member configured to move in a direction crossing a longitudinal direction of the light-guide member,
    wherein the light-guide member is configured to emit light, which has entered from an incident surface of the light-guide member, as light that is linearly distributed in the longitudinal direction;
    a light source configured to emit the light;
    an optical fiber configured to guide the light emitted by the light source to the incident surface;
    an apparatus frame to which the light source is fixed;
    a scanning unit comprising a full-rate carriage configured to cause the light-guide member to move in the direction crossing the longitudinal direction;
    a half-rate carriage configured to move in the direction crossing the longitudinal direction;
    a CCD substrate; and
    a heat-radiation member that is disposed inside of the apparatus frame to which the light source is fixed and that is configured to radiate heat generated by the light source,
    wherein the heat-radiation member is disposed in an area located between ends of the light-guide member in the longitudinal direction, and
    wherein the heat-radiation member is configured to be disposed between a position of the full-rate carriage and a position of the half-rate carriage in the direction crossing a longitudinal direction of the light-guide member.

* * * * *